United States Patent

Pruessner

[15] 3,703,984
[45] Nov. 28, 1972

[54] METHOD AND APPARATUS OF CENTRIFUGAL SEPARATION
[72] Inventor: Harold T. Pruessner, 6015 Rutherglenn, Houston, Tex. 77035
[22] Filed: April 21, 1970
[21] Appl. No.: 30,533

[52] U.S. Cl. .............................................. 233/28
[51] Int. Cl. ........................................... B04b 1/00
[58] Field of Search .......... 233/27, 28, 32, 34, 38, 40, 233/44, 45, 22, 47 R, 46, 47

[56] References Cited

UNITED STATES PATENTS

| | | | |
|---|---|---|---|
| 2,816,704 | 12/1957 | Skarstrom | 233/1 R |
| 3,344,984 | 10/1967 | Kopczynski | 233/27 X |
| 3,027,390 | 3/1962 | Thurman | 233/44 X |
| 3,311,295 | 3/1967 | Rubissow | 233/22 X |
| 3,073,517 | 1/1963 | Pickels et al. | 233/32 |
| 3,129,174 | 4/1964 | Pickels et al. | 233/21 X |

Primary Examiner—Jordan Franklin
Assistant Examiner—George H. Krizmanich
Attorney—Daniel W. Sixbey

[57] ABSTRACT

The method is employed to separate components of a solution having unlike specific gravities and includes subjecting the solution to a centrifugal force in a range from 150,000 times the force of gravity or above for a time sufficient to permit the occurrence of substantial equilibrium between solution components. These components are physically separated while the centrifugal force employed to cause separation is maintained.

The centrifuge head employed to accomplish the separation of the solution constitutes a solid metallic disc having an annular separation chamber internally formed adjacent the periphery thereof. An inflow network and two outflow networks formed at different levels in the disc join the separation chamber to the central portion of the disc.

18 Claims, 8 Drawing Figures fig.1 fig.2

INVENTOR.
Harold T. Pruessner
BY Daniel W. Sifley
ATTORNEY fig.3 fig.4 fig.5

INVENTOR.
Harold T. Pruessner
BY
ATTORNEY

PATENTED NOV 28 1972

INVENTOR.
Harold T. Pruessner
BY
Daniel W Sibley
ATTORNEY

Fig.8

METHOD AND APPARATUS OF CENTRIFUGAL SEPARATION

The present invention relates to a novel method and apparatus for the centrifugal separation or concentration facilitating separation of organic and inorganic material from solution with a base liquid of a different specific density. This invention is particularly applicable with salt solutions, although it may be effectively employed to separate or concentrate the light and heavy components forming any fluid mixture.

As a practical matter, the separation or concentration of inorganic material of small molecular weight, such as inorganic salts not attached to large polymers, from solution with a base liquid of a different specific gravity solely by centrifugation has not previously been proven to be possible. A number of theories have been advanced based upon the premise that differences in the specific gravity of inorganic components within a solution should result in the segregation of these components in relation to their molecular weight when the solution is subjected to centrifugation. Actually, low molecular weight inorganic salts do not concentrate to any appreciable extent under the usual conditions of ultracentrifugation, and diffusion tends to redispose these salts in solution as a centrifuge slows at the end of a centrifuging cycle.

Previous attempts have been made to segregate salt components from sea water by centrifugation through repeated centrifuge stages at 25,000 to 40,000 times the force of gravity. However, the normal salinity range for sea water is from about 3.5 percent to 4.2 percent, and effective salt concentration by repeated centrifugation in accordance with previous techniques produces negligible results. In fact, experimentation has indicated that a 10 percent solution of Na Cl will not separate or concentrate effectively when subjected to centrifuge forces of only 40,000 times the force of gravity.

The failure to effectively separate or concentrate inorganic salts from solution solely through centrifugation has led to the development of a number of combined methods which employ centrifugation and controlled heat or centrifugation and filtering by osmosis through a membrane or filter. Such methods require that additional components be added to a centrifuge structure to accomplish heating or filtering, and these components increase the expense involved in the separation process while decreasing the effectiveness of the centrifuge. British Pat. No. 907,657 illustrates a combined centrifuging and heating process for the separation of isotopes from solution. It will be noted that in this patent the centrifuge required to accomplish the method would be quite limited in speed due to a lack of balance resulting from the irregular radius thereof. However, this construction is required to establish the specific temperature gradient defined by the patent for accomplishing isotope separation.

The novel method and apparatus of the present invention have been developed to achieve effective separation or concentration of inorganic materials in solution solely by centrifugation without requiring a centrifuge construction which is inefficient or overly expensive. The use of filtering membranes or high temperature gradients for separation is rendered unnecessary by the method of this invention.

Furthermore, it has previously been deemed impossible to concentrate or separate mixed miscible solutions by centrifugal force. Miscible components of a solution having different specific densities can be concentrated according to the present method to facilitate separation.

The primary object of the present invention is to provide a novel and improved method and apparatus for the centrifugal separation or concentration of inorganic material from solution with a base liquid of a different molecular density.

Another object of the present invention is to provide a novel method and apparatus for the centrifugal separation or concentration of inorganic material from solution which involves the physical removal of material of greater molecular density than the solvent while such material is under centrifugal force.

A further object of the present invention is to provide a novel and improved method and apparatus for the separation or concentration of inorganic materials from solution solely by centrifugation.

Another object of the present invention is to provide a novel and improved apparatus for centrifugal separation which includes a centrifuge head adapted to subject a solution to forces in excess of several thousand times the force of gravity.

A further object of the present invention is to provide a novel and improved apparatus for centrifugal separation which includes a centrifuge head adapted to attain high rotational speeds while remaining balanced during the reception thereby of solutions of different specific gravities.

Another object of the present invention is to provide a novel and improved apparatus for centrifugal separation which includes a centrifugal head designed to reduce solution flow distance within the head to reduce eddy currents which tend to lessen separation of constituents of a solution to be centrifuged.

A still further object of the present invention is to provide a novel and improved apparatus for centrifugal separation which operates effectively without filter membranes to divide a solution into lamina in accordance with the specific gravity of the components thereof.

These and other objects of the present invention will become readily apparent upon a consideration of the following description taken in conjunction with the accompanying drawings in which:

Basically, the novel method of the present invention involves the separation or concentration facilitating separation of components from solution primarily through the agency of centrifugal force. This method is particularly applicable to inorganic salt solutions, but may even be applied to concentrate miscible components of a solution.

It has been previously believed to be practically impossible to effectively separate or concentrate soluble inorganic salts in solution solely by centrifugal force, and absolutely impossible to so concentrate miscible components of a solution. However, by employing the method of the present invention, both can be accomplished.

In accordance with the present invention, solutions containing highly soluble inorganic salts or two miscible components of differing specific densities are centrifuged at very high speed to create forces many times the force of gravity (G forces). Ideally, centrifugation is performed in a manner designed to divide the solution into lamina or layers and is continued for a time sufficient to permit equilibrium between layers to occur. Once equilibrium between layers results, the concentrated layer is separated from the less concentrated layer while substantially maintaining the centrifugal force which caused the lamina. When equilibrium between layers is reached at a given g force, separation will not improve despite prolonged centrifugation at the same g force.

In the method of the present invention, there may be a continuous inflow of solution which, under centrifugal force, separates into lamina of greater and lesser specific gravity. Solution is continuously and separately removed from the lamina of greater and lesser specific gravity.

In the case of conventional centrifugal separation methods, centrifugal force may be expressed by the formula:

$F = (w/g) r w^2$ $F$ = centrifugal force (grams)
$w$ = weight of particle (grams)
$r$ = radius of curvature of path (cm)
$w$ = angular velocity (rad/sec)
$g$ = acceleration of gravity (cm/sec$^2$)

For the separation of solutions according to the present method, the concentration of the solution and the relative densities of the components thereof are also factors affecting separation. The density values of the solution are often directly affected by temperature, and in all instances, the temperature should be maintained at a level which will not inhibit fluid movement.

First, applying the method of the present invention to highly soluable inorganic salts in solution, an appreciable increase in concentration will be achieved when salts having a specific gravity and molecular weight equal to or greater than that of sodium chloride are subjected to centrifugal forces in excess of 150,000 g. Best results are obtained by subjecting such solutions to the greatest centrifugal force possible within the range about 150,000 g, i.e., 150,000 to 400,000 g or higher, depending upon the structural limitations of the centrifuge.

Taking seawater as an example, it is known that the specific gravity of water is essentially 1 and that of seawater is 1.025. Molecular movement in solution is a fact, so if seawater is subjected to a sufficient G force, the more concentrated or hypertonic solution should separate from the less concentrated or hypotonic solution. Thus I find that lamina may be formed according to the concentration of the components of the solution and such lamina may be subsequently separated while being maintained under centrifugal force. The operability of the basic method of this invention has been demonstrated with conventional ultracentrifugation equipment to show that a. Inorganic salts in solution are concentratable by centrifugal force alone at forces above 100,000 times g.
b. Inorganic salts in solution are crystalizable by centrifugal force.
c. The amount of separation of inorganic salts in solution by centrifugal force is related to the concentration of the salt and increases with increasing salt concentration.
d. The amount of separation by centrifugal force of inorganic salts in solution is related to the specific gravity of the salt and increases with increased salt density.
e. The amount of separation of inorganic salts in solution by centrifugal force is related to the amount of centrifugal force applied.
f. The amount of separation of inorganic salts in solution by centrifugal force is related to the length of time force is applied up to the point where substantial equilibrium between components of the solution occurs. After equilibrium is reached, continued application of centrifugal force has little effect.
g. The temperature influence on the separation of inorganic salts in solution by centrifugal force is negligible so long as the temperature of the solution is maintained at a level which will not interfere with fluid movement.
h. The components of a miscible solution are separable by centrifugal force.

All of the tests employed to obtain the results in the following examples were accomplished with a Beckman L–2 ultracentrifuge with a capacity of 198,000 g at 50,000 rpm. This ultracentrifuge required a 10$^{-5}$ mm Hg at a temperature of approximately 10° C to operate. This was a vacuum requirement of the centrifuge head to prevent overheating, and was not a requirement for separation of the saline solutions employed.

The tests were accomplished using a batch type centrifuge method wherein the sample was centrifuged and then the centrifuge was stopped before the measurement could be taken. This was accomplished primarily to establish the validity of the basic premises of the present method and is not the preferred procedure for obtaining separation. The separation achieved with this batch method is adversely affected by the diffusion which occurs within the sample as the centrifuge slows. In many cases, it requires 5 to 10 minutes for the centrifuge to stop so that a measurement can be taken, and by this time the effects of centrifugation may have been substantially negated by sample diffusion. In spite of diffusion, measurable results were obtained.

The salt concentrations of the top and bottom layers of the salt solutions tested were measured with an Abbe Refractometer at 25° C.

EXAMPLE 1

The results obtained for salt-water solutions centrifuged for 3 hours were as follows:

| Salt Solution | Before centrifugation % concentration | After centrifugation concentration % Top Layer | % bottom Layer |
|---|---|---|---|
| Sodium Chloride | 1% | 1% | 1% |
| Molecular Weight 58 | 2.5% | 2.5% | 2.5% |
| Specific Gravity 2.16 | 5% | 5% | 5% |
|  | 10% | 9.8% | 11.2% |

| Salt Solution | Before centrifugation % concentration | After centrifugation Refractive Index Top ntD | Bottom ntD |
|---|---|---|---|
| Sodium Chloride | 0.5–1.0 | no appreciable change | |
|  | 2.5 | 1.3355 | 1.3356 |
|  | 10.0 | 1.3471 | 1.3478 |

| Salt Solution | Before centrifugation % concentration | After centrifugation concentration % Top Layer | % Bottom Layer |
|---|---|---|---|
| Barium Iodide | 1% | 1% | 1% |
| Molecular Weight 58 | 2.5% | 2.25% | 2.75% |
| Specific Gravity 2.16 | 4.7% | 3.9% | 5.5% |
|  | 10% | 8.5% | 11.7% |

| Salt Solution | Before centrifugation % concentration | After centrifugation Refractive Index Top ntD | Bottom ntD |
|---|---|---|---|
| $BaI_2$ | 0.5–1.0 | no appreciable change | |
|  | 2.5 | 1.3344 | 1.3349 |
|  | 10.0 | 1.3423 | 1.3466 |

EXAMPLE 2

Employing $BaI_2$ in a 5 percent solution for test under the conditions of Example 1, it was noted that this salt, with a specific gravity which is over two times that of NaCl and a molecular weight which is six times that of NaCl, will not begin to appreciably concentrate until forces in excess of 55,000 g are reached.

| G forces | Refractive Index Top ntD | Bottom ntD |
|---|---|---|
| 55,000 G | 1.3386 | 1.3393 |
| 150,000 G | 1.3381 | 1.3395 |

The following results occur when the G force is varied with the $BaI_2$ 5 percent solution centrifuged for 3 hours:

| G forces | % Concentration After centrifugation Top Layer | Bottom Layer |
|---|---|---|
| 7,937 G | 5% | 5% |
| 71,433 G | 4.7% | 5.4% |
| 198,000 G | 4.1% | 5.9% |

When the time of centrifugation at 150,000 g is varied, the following occurs with the $BaI_2$ 5 percent solution:

| Time | % Concentration After centrifugation Top Layer | Bottom Layer |
|---|---|---|
| 1 hr. | 4.5% | 5.5% |
| 2 hrs. | 4.4% | 5.6% |
| 3 hrs. | 4.1% | 5.9% |

EXAMPLE 3

Under the conditions of Example 1 but at centrifuge forces of substantially 150,000 g, the following results were obtained with 10 percent salt solutions:

| Salt | Centrifugation Time | After Centrifugation Refraction index Top ntD | Bottom ntD |
|---|---|---|---|
| NaCl | 3 hrs. | 1.3485 | 1.3486 |
|  |  | 1.3484 | 1.3486 |
| $NH_4Br$ | 3 hrs. | 1.3468 | 1.3469 |
|  |  | 1.3468 | 1.3470 |
| $MgSO_4$ anh | 3 hrs | 1.3502 | 1.3509 |
| $CuSO_4.5H_2O$ | 3 hrs. | 1.3433 | 1.3441 |
|  |  | 1.3433 | 1.3441 |
| $BaCl_2.2H_2O$ | 3 hrs. | 1.3443 | 1.3449 |

| Salt | Centrifugation Time | After Centrifugation Refraction Index Top ntD | Bottom ntD |
|---|---|---|---|
| $BaBr_2.2H_2O$ | 1 hr. | 1.3442 | 1.3453 |
|  |  | 1.3441 | 1.3452 |
|  | 2 hrs. | 1.3430 | 1.3439 |
|  |  | 1.3429 | 1.3439 |
|  | 3 hrs | 1.3430 | 1.3439 |
|  |  | 1.3429 | 1.3443 |

| Salt Solution | Before centrifugation % Solution | After Centrifugation % concentration top layer | % concentration Bottom Layer | % Separation |
|---|---|---|---|---|
| NaCl *M.W. 58 **S.G. 2.16 | 10% | 10% | 10% | 0 |
| $MgSO_4$ M.W. 120 S.G. 2.66 | 10% | 9.8% | 10.2% | 4% |
| $NH_4Br$ M.W. 97 S.G. 2.33 | 10% | 9.9% | 10.1% | 2% |
| $CuCO_4$ M.W. 159 S.G. 3.60 | 6.4% | 6.2% | 6.6% | 6.6% |
| $BaBr_2$ M.W. 297 S.G. 4.78 | 8.9% | 8.5% | 9.4% | 9.5% |

*Molecular Weight
**Specific Gravity

EXAMPLE 4

A solution of miscible components, 50 percent water and 50 percent isopropyl alcohol centrifuged at substantially 150,000 g under the conditions of Example 1 produced the following results:

| Time | Refractive Index Top ntD | Bottom ntD |
|---|---|---|
| 1 hr. | 1.3639 | 1.3637 |
|  | % Alcohol Concentration Top Layer | Bottom Layer |
| 1 hr. | 49.45% | 49.25% |

It appears that the influence of temperature on centrifugal separation of inorganic salts is minimal, so long as the temperature of the salt solution is maintained at a level which does not interfere with fluid movement. It is known that the density value of a substance is directly affected by temperature. This is illustrated as follows:

| Substance | Temperature | Specific Gravity | Specific Volume |
| --- | --- | --- | --- |
| Water | 4° C | 0.9999 | 1.000 |
| Water | 30° C | 0.9959 | 1.004 |
| Mercury | 4° C | 13.58 | 0.0736 |
| Mercury | 30° C | 13.52 | 0.0739 |

As the specific gravity of all components of a solution decrease in response to temperature increases, the effects of temperature on centrifugal separation are substantially negligible. Also, increases in temperature increase the molecular movement in a solution which facilitates rediffusion after separation occurs. However, the viscosity of water decreases with an increase in temperature which would facilitate separation. An increase in temperature of a solution decreases the viscosity of the water content to enhance separation but increases molecular movement to facilitate rediffusion. These factors are substantially offsetting.

Since it has now been demonstrated that separation and concentration of inorganic salts in solution is possible by centrifugal force and the amount of separation is related to the concentration of the salt, the specific gravity of the salt, the amount of force applied, the length of time the force is applied and possibly by a minimal amount to the solution temperature, and since centrifuges are already available commercially that will generate a force of 420,000 g (Bechman Model L2-65B), the novel method of the present invention is workable and practical for the concentration and separation of salts in solution and solutions having unlike specific gravities although miscible.

As the separation of inorganic material in solution is definitely effected by the specific gravity, the more precious metals should be more readily separable by centrifugal force. Silver has a specific gravity of 10.50, uranium specific gravity of 18.95, plutonium specific gravity 19.84, gold specific gravity 19.32, and platinum specific gravity 21.45. These precious metals could be extracted from the water by further centrifugation of the hypertonic solution at the same time that potable water is produced.

To prevent diffusion, it is preferable to form lamina within the liquid sample during centrifugation and to physically separate these lamina while the centrifugal force used for separation is maintained. This may be accomplished by employing the novel centrifuge heads of the present invention.

Referring to FIGS. 1–5, the centrifuge head of the present invention indicated generally at 10 includes a disc shaped rotor 12 which is provided with centrally formed rotor shafts 14 and 16. These central rotor shafts are mounted upon a rotor support structure by bearing mounts of a known type suitable for high speed centrifugation rotors. Air bearings are exemplary of bearings which have been previously employed for this purpose, and which permit the rotor to be driven at high speeds by drive means connected thereto in a conventional manner.

Figure 1:
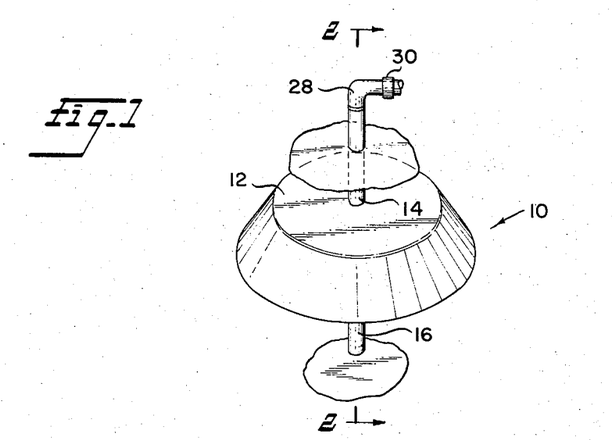
FIG. 1 is a perspective view of the centrifugal head of the present invention.
Figure 2:
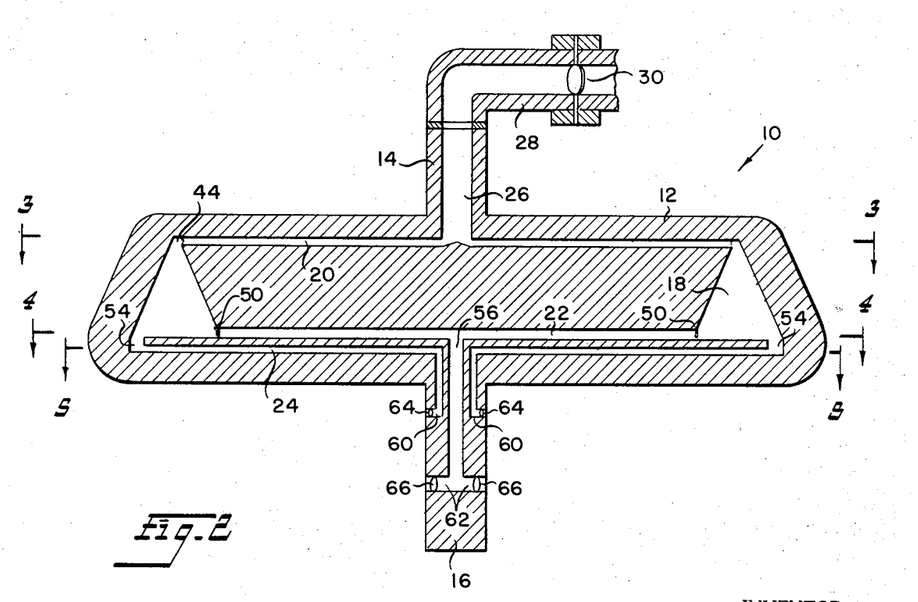
FIG. 2 is a longitudinal sectional view taken along lines 2—2 of FIG. 1.

The rotor 12 is a metal circular disc having an annular separation chamber 18 formed adjacent the periphery thereof. This separation chamber is connected to the central section of the disc by an inflow network 20 and first and second outflow networks 22 and 24, which are formed at different levels through the interior of the disc.

The inflow network 20 is connected to receive a solution to be centrifuged from an inlet 26 formed in the center of the rotor shaft 14. This inlet is in turn connected to receive a metered amount of solution from a supply line 28 on the rotor support. This supply line may include a metering valve 30, or in the alternative, the metering valve may be provided in the inlet 26.

Figures 3, 4, 5:
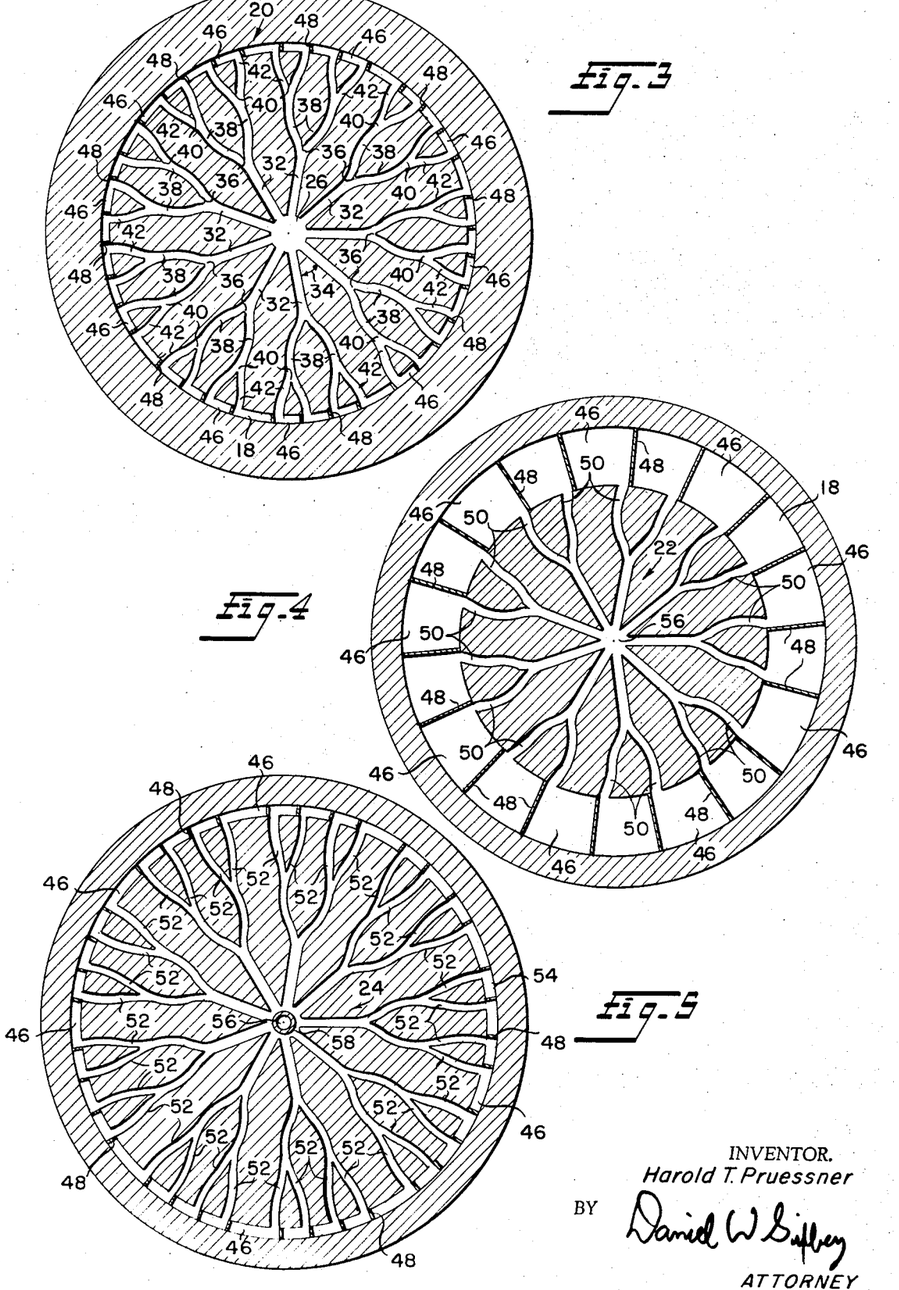
FIG. 3 is a sectional view taken along lines 3—3 of FIG. 2.
FIG. 4 is a sectional view taken along lines 4—4 of FIG. 2.
FIG. 5 is a sectional view taken along lines 5—5 of FIG. 2.

The inflow network 20, as well as the outflow networks 22 and 25, is formed to render the centrifugal head 10 radially symmetrical so that fluids of varying densities may be centrifuged without unbalancing the head. The inflow and outflow networks are similar in construction and constitute a plurality of equally spaced channels beginning at the center of the rotor 12 and repeatedly dividing into equally spaced branches as they extend outwardly to the separation chamber 18 to form an arborization network. As the inflow and outflow networks are formed in a similar manner, the manner in which each is formed will be readily understood by considering in detail the construction of the inflow network 20.

With reference to FIG. 3, the inflow network 20 begins at the inlet 26 as a plurality of radially extending channel segments 32 of equal length communicating with the inlet and extending outwardly from equally spaced points around the circumference of the inlet. The angles 34 formed by any two adjacent channel segments are equal, so that should the channel segments extend to the periphery of the rotor 12, they would divide the rotor into pie shaped sections of equal area. However, the channel segments extend outwardly to equally spaced first division points 36 where each segment divides into two branch segments 38. The two branch segments originating from a channel segment are of equal length and follow identical but opposite curved paths outwardly from the first division point and then back in a radial direction to second division points 40. From the second division points, each branch segment again divides into two secondary branch segments 42 of equal length which follow identical but opposite curved paths outwardly from the second division point and then back in a radial direction to equally spaced inflow ports 44 formed in the separation chamber 18.

Figure 8:
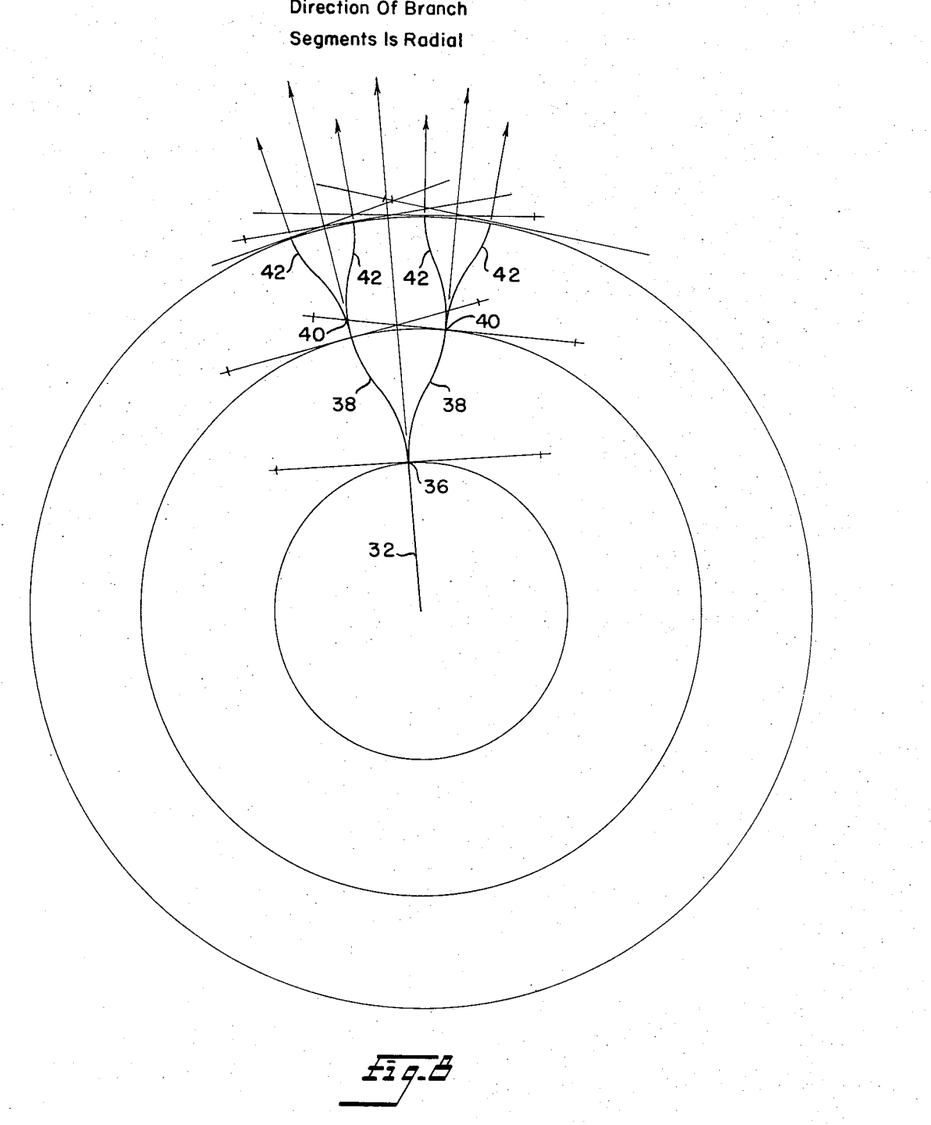
FIG. 8 is a flow diagram illustrating fluid flow through the arborization network of FIG. 3.

FIG. 8 is a flow diagram illustrating the fluid flow path along the center line of a channel segment 32, branch segments 38 and secondary branch segments 42. It will be noted from FIG. 8 that as the channel segments 32 are of equal length, the first division points 36 in the flow diagram are circularly arranged about a first circle with the inlet 26 as a center. Similarly, the branch segments 38 are of equal length and follow identical but opposite curved paths, so that a second circle with the inlet as a center can be drawn through the second division points 40 in the flow diagram. Finally, the secondary branch segments are again of equal length and follow identical but opposite curved paths, and therefore the inflow ports 44 are circularly arranged to open into the annular separation chamber 18. The branch segments and secondary branch segments are formed so that the radius of the second circle in the flow diagram through said second division points is twice the radius of the first circle through said first division points and the radius of a circle through the entrant points of said inflow ports into the separation chamber is three times that of the first circle.

It is obvious that for large diameter centrifuge heads, the secondary branch segments 42 could again divide at division points occurring at the position of the inflow ports 44, and that this division process may reoccur until the separation chamber is ultimately reached. Similarly, for small diameter centrifuge heads the inflow ports might occur at the ends of the branch segments 38.

The primary features in the design of the arborization network forming the inflow network 20 are that all division points and inflow ports be equally spaced about the circumference of circles having the inlet 26 as a center and that these circles cross equally spaced points along a radial line for the outermost circle. Also, at each division point and at the inflow ports, the direction of the branch segments should be radial. This design provides for a minimum amount of turbid fluid flow.

The separation chamber 18 may be substantially rectangular or circular in configuration, but is preferably triangular as illustrated in FIG. 2. The chamber is divided into a plurality of separation compartments 46 by spaced walls 48 which extend across the separation chamber between the inner and outer walls thereof. A centrally positioned inflow port 44 opens into the top of each separation compartment, preferably at the forward portion thereof, while a first outlet port 50 for hypotonic solution opens into the bottom forward portion of each said separation compartment adjacent the inner compartment wall. A second outlet port 52 for hypertonic solution opens into a channel 54 in the bottom of each separation compartment; this channel being formed adjacent the outermost wall of the separation compartment. Preferably, the second outlet port is positioned at the rear portion of the separation compartment adjacent the rear compartment wall.

The first outlet ports 50 are connected to the outflow network 22 while the second outlet ports 52 are connected to the outflow network 24. As previously indicated, the outflow networks 22 and 24 are formed in a manner identical to the inflow network 20, with the outflow network 22 terminating at a first outflow duct 56 extending through the center of the rotor shaft 16 while the outflow network 24 terminates at a second circular outflow duct 58 which is formed around the first outflow duct. The outflow ducts 56 and 58 are connected to separate collection chambers formed on the rotor support by outlet vents 60 and 62. Suitable control valves 64 and 66, such as solenoid control valves, are provided in the outlet vents to control the flow of hypotonic and hypertonic solution therefrom.

In the operation of the centrifuge head 10, the valves 64 and 66 are closed and a metered amount of solution is introduced through the valve 30. The centrifuge head may have previously been driven to a desired speed or may now be brought to speed to cause separation of the solution in the separation chamber 18. The heavier components of the solution will be forced outwardly and downwardly against the outer wall of the chamber 18 while the lighter components will be forced upwardly and inwardly against the inner chamber wall. When sufficient time has elapsed for separation to occur, the valves 64 and 66 are opened to permit fluid to flow from the outlet vents 60 and 62 while simultaneously, the valve 30 is opened to furnish an equal amount of raw solution to the centrifuge head. The initial output from the outlet vents will be uncentrifuged solution from the outflow networks 22 and 24, and this will be discarded or recirculated. However, once the outflow networks are cleared, a solution containing a high concentration of the heavier components of the input solution will flow from the vent 60.

With the outflow networks clear of uncentrifuged solution, the separation process in the head 10 becomes a continuous process with metered amounts of solution being simultaneously introduced and withdrawn while the head is maintained at separation speed. In some instances, flow through the head can actually be continuous with all of the valves 30, 64 and 66 open, for with some saline solutions, separation and equilibrium occur in a very short time at high speed. The valves 64 and 66 can be used to control the proportion of hypertonic and hypotonic solutions withdrawn. In other cases, the valves 30, 64 and 66 will be closed for a period sufficient to permit equilibrium to occur between solution components in the chamber 18. However, during this period it is impossible for diffusion to occur between the concentrate and dilute solutions in the outflow networks 22 and 24. Also, withdrawal of the concentrate and dilute solutions from the chamber 18 while centrifugal force is maintained substantially eliminates diffusion.

It will be noted that most solution flow in the centrifuge head 10 occurs before and after separation. It has been discovered that eddy currents arising from the flow of fluid in the separation chamber of a centrifuge tend to lessen the resultant fluid component separation, and therefore the separation chamber 18 is designed with the walls 48 to minimize circular flow of solution in the chamber.

The design of the disc shaped centrifuge head 10, which may be a solid disc, imparts the strength required to centrifuge fluid at extremely high speeds, and the radial symmetry provided by the inflow and outflow network design alleviates head balancing problems often experienced by high speed centrifuge heads. The inflow network facilitates an even distribution of fluid to the separation chamber, and the outflow networks permit fluid withdrawal from the center of the centrifuge head, thereby conserving a great amount of kinetic energy to render the system more efficient. If fluid were directly removed from the separation chamber at the periphery of the head, a greater force would be required to drive the head.

The force of gravity should be sufficient to cause the flow of fluid through the centrifuge head 10. It will be noted that the outlet vents 60 and 62 are more peripheral with relation to the center of the head than is the inlet 26. With the head spinning, the fluid tends to exit from the most peripheral openings. Also, flow may be facilitated by mild pressure applied to the inlet 26.

Figure 6:
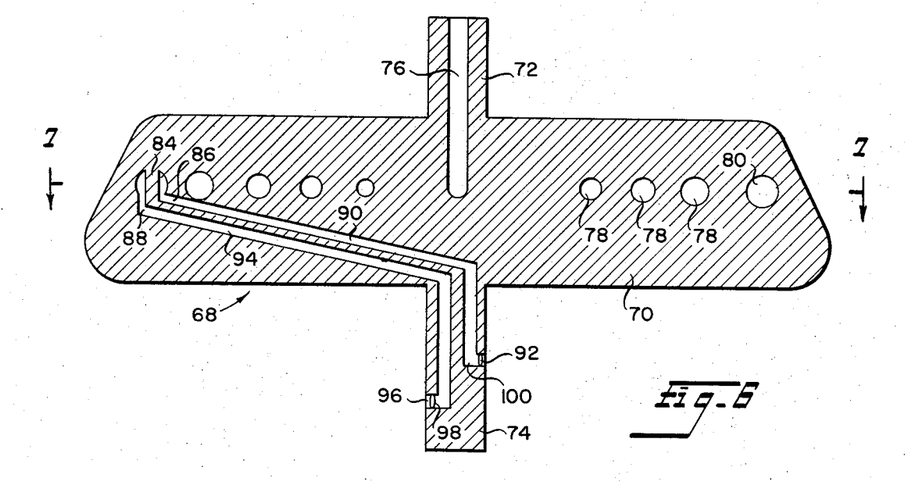
FIG. 6 is a longitudinal sectional view of a second embodiment of the centrifugal head of the present invention.
Figure 7:
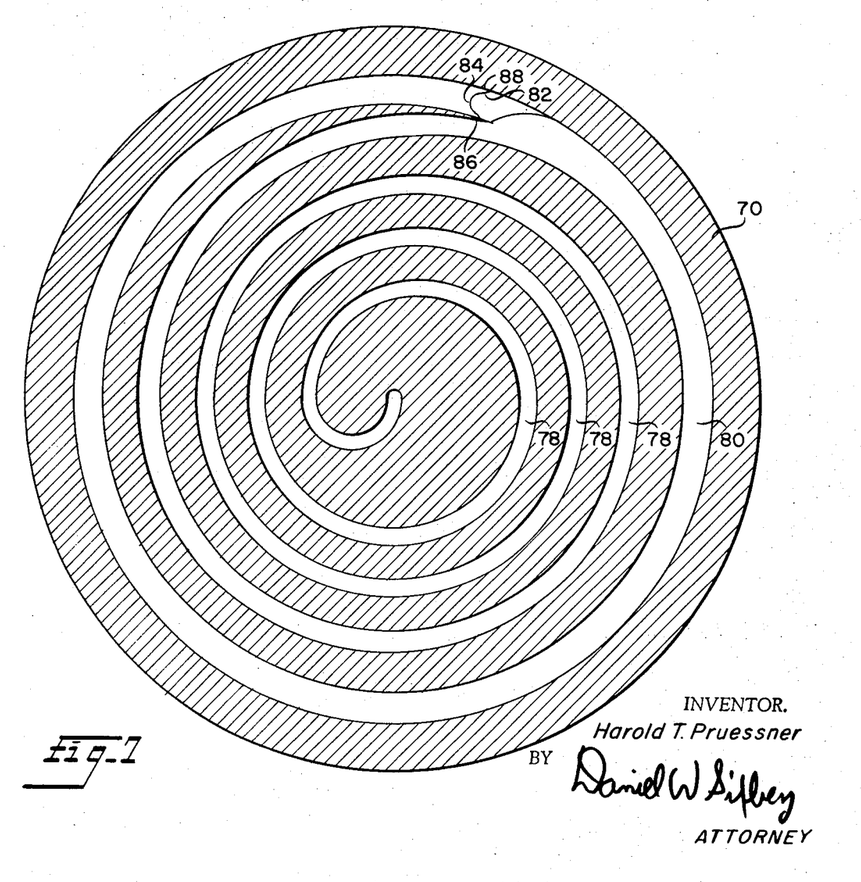
FIG. 7 is a sectional view taken along lines 7—7 of FIG. 6.

FIGS. 6 and 7 illustrate a second embodiment of the centrifuge head of the present invention, such head being indicated generally at 68. The outer configuration of the head 68 is identical to that of the head 10 in FIG. 1 with a disc shaped rotor 70 being provided with centrally located rotor shafts 72 and 74. An inlet 76 is formed centrally in the rotor shaft 72 and communicates with the innermost end of an internal, helical inflow network 78. The inflow network 78 begins at the inlet 76 at the center of the rotor 70 and winds outwardly to a substantially annular internal separation chamber 80 formed adjacent the periphery of the rotor. As will be noted in FIG. 6, the convolutions of the inflow network are circular in cross section and gradually increase in diameter as the network progresses from the center of the rotor to the separation chamber.

The separation chamber 80 does not form a complete circle about the center of the rotor 70, but instead terminates at a U shaped end wall 82. This end wall includes a projecting divider 84 located centrally of the separation chamber which separates a first outlet port 86 from a second outlet port 88. The first outlet port is formed at the bottom and adjacent to the innermost wall of the separation chamber and provides an exit for the hypotonic solution while the second outlet port is formed at the bottom and adjacent to the outermost wall of the separation chamber to provide an exit for the hypertonic solution. A first outflow channel 90 is connected between the outlet port 86 and a vent 92 formed in the rotor shaft 74 while a second outflow channel 94 connects the outlet port 88 to a second vent 96 in the rotor shaft. Valves 98 and 100 operate to control the flow from the vents 92 and 96.

The centrifuge head 68 operates in substantially the same manner as the centrifuge head 10 with the fluid to be centrifuged passing into the head through the inlet 76. The chambers formed by the convolutions of the inflow network 78 increase in size as the network approaches the separation chamber 80, so that as fluid moves outwardly from the central axis of the rotor 70, the rate of flow decreases while the centrifugal force increases. This decrease in the rate of flow reduces the eddy currents which impair separation.

Fluid component separation occurs to some degree in each of the convolutions of the inflow network 78, and by the time the fluid reaches the separation chamber 80, substantial lamina are formed. The heavy fluid components pass to the section of the separation chamber adjacent the chamber outer wall while the lighter components move inwardly toward the inner wall thereof. The divider 84 separates these two sections of the separation chamber to facilitate the passage of the heavier and lighter fluid components into separate outflow channels.

Unlike the centrifuge head 10, the head 68 permits progressive separation to occur in the fluid inflow network. However, the helical inflow network for the head 68 does not provide the radial symmetry imparted to the head 10 by the inflow network thereof.

I claim:

1. A centrifuge head adapted to be rotatably mounted upon a support in a centrifugal separator comprising a substantially disc shaped rotor, rotor shaft means connected to said rotor and projecting along the central axis thereof from opposite sides of said rotor to form a vertical axis of rotation, a peripheral separation chamber formed in the outer portion of said rotor, centrally formed fluid inlet means communicating with the interior of said rotor to provide a path for introducing fluid into said rotor from the exterior thereof, an internal inflow network formed in said rotor and connected between said fluid inlet means and separation chamber, first and second fluid outlet means formed centrally in said rotor on a side thereof opposite to said inlet means, said first and second fluid outlet means communicating with the interior of said rotor to provide paths for passing fluid from said rotor to the exterior thereof, a first outflow network opening into said separation chamber adjacent to the innermost wall thereof, said first outflow network extending between said separation chamber and said first fluid outlet means, and a second outflow network opening into said separation chamber adjacent to the outermost wall thereof, said second outflow network extending between said separation chamber and said second fluid outlet means, said inflow and first and second outflow networks being radially symmetrical.

2. The centrifuge head of claim 1 wherein said fluid inlet means opens to the exterior of said rotor at a point more centrally located than opening points for said first and second fluid outlet means, said first and second fluid outlet means opening to the exterior of said rotor at points closer to the periphery thereof.

3. The centrifuge head of claim 1 wherein said rotor constitutes a solid metallic disc, said separation chamber, inflow and first and second outflow networks being formed in the interior of said solid disc.

4. The centrifuge head of claim 1 wherein said separation chamber is triangular in cross section, said inflow network opening into said separation chamber adjacent to the apex of said chamber, and said first and second outflow networks opening into the lower portion of said separation chamber.

5. The centrifuge head of claim 1 wherein said inflow network is of helical configuration, the convolutions of said inflow network increasing in cross section as the network extends outwardly from the central portion of said rotor.

6. The centrifuge head of claim 5 wherein said separation chamber constitutes an enlarged extension of said helical inflow network, the separation chamber terminating at a chamber end wall having a central divider extending centrally therefrom to divide the terminal portion of said separation chamber into an inner and an outer section, said first outflow network opening into said inner section and said second outflow network opening into said outer section.

7. The centrifuge head of claim 1 wherein said fluid inlet means is positioned at the center of said rotor and said inflow network is a substantially symmetrical arborization network extending outwardly from said fluid inlet means, said aborization network including a plurality of equally spaced first division points circularly arranged about the center of said rotor, a channel segment extending from the center of said rotor to each such first division point, each channel segment dividing at said first division point into two branch segments of equal length having spaced terminal portions which extend in a direction substantially radially of said rotor, said branch segments following oppositely curved paths of the same curvature to said terminal portions.

8. The centrifuge head of claim 7 wherein said arborization network includes a plurality of successive groups of division points circularly arranged about circles of increasing diameter from said rotor center with said separation chamber forming the outermost circle, said circles being equally spaced along a radial line for said rotor, the secondary division points on adjacent circles subsequent to said first division points forming the terminus for a preceding branch segment, each said preceding branch segment dividing at said secondary division point into two secondary branch segments of equal length having spaced terminal portions which extend in a direction substantially radially of said rotor, said secondary branch segments following oppositely curved paths of the same curvature to said terminal portions.

9. The centrifuge head of claim 8 wherein the secondary branch segments beginning with the division points adjacent to said separation chamber terminate at said separation chamber and open into the interior thereof.

10. The centrifuge head of claim 9 wherein said first and second outflow networks constitute arborization networks substantially identical in configuration to said inflow network.

11. The centrifuge head of claim 10 wherein said rotor shaft means includes an upper shaft and a lower shaft, said fluid inlet means constituting a channel extending along the central longitudinal axis of said upper shaft, said first fluid outlet means constituting a first channel formed in said lower shaft and opening exteriorly thereof at the side of said lower shaft, and said second fluid outlet means constituting a second channel formed in said lower shaft and opening exteriorly thereof at the side of said lower shaft.

12. The centrifuge head of claim 9 wherein said separation chamber includes equally spaced end walls which extend across the separation chamber between the inner most and outermost walls thereof to divide said separation chamber into a plurality of separation compartments, each of said separation compartments having a secondary branch segment of said inflow network in communication therewith.

13. The centrifuge head of claim 12 wherein said inflow network opens into the top portion of said separation chamber and said first and second outflow networks open into the lower portion of said separation chamber, each said separation compartment receiving a secondary branch segment of said first and second outflow networks.

14. The centrifuge head of claim 13 wherein each said separation compartment is triangular in cross section, the secondary branch segments of said inflow network and first outflow network opening at the forward portion of each said separation compartment and the secondary branch segment of said second outflow network opening at the rear portion of each said separation compartment.

15. A method of separating organic and inorganic compounds in solution and miscible solutions having unlike specific densities by centrifugation alone which includes subjecting said solution to a centrifugal force in a range exceeding 150,000 times the force of gravity sufficient to divide the components of said solution into circular lamina, minimizing solution flow during the formation of said lamina, maintaining the solution under centrifugal force for a time sufficient to permit the occurrence of substantial equilibrium between said lamina, and subsequently physically separating said lamina while maintaining the solution under said centrifugal force.

16. A method of claim 15 which includes maintaining a continuous inflow of solution to be separated into lamina of greater and lesser specific density and maintaining a continuous outflow of solution after separation of said lamina.

17. A method of claim 16 which includes maintaining said solution during centrifugation at a temperature sufficient to facilitate free fluid movement.

18. A method of claim 15 which includes directing an inflow of solution to be separated to a separation chamber while minimizing turbidity and eddy currents therein, and subsequently minimizing fluid flow in said chamber to permit the occurrence of equilibrium.

* * * * *